United States Patent [19]
Andersson

[11] 3,896,840
[45] July 29, 1975

[54] PILOT OPERATED FLOW CONTROL VALVE

[76] Inventor: Sven E. Andersson, 138 Lakeview Ln., Chagrin Falls, Ohio 44022

[22] Filed: May 1, 1974

[21] Appl. No.: 465,844

[52] U.S. Cl. .................... 137/219; 251/30; 251/25; 137/625.27
[51] Int. Cl.² ......................................... F16K 31/42
[58] Field of Search ... 251/30, 25; 137/219, 596.17, 137/596.18, 625.65, 625.27

[56] References Cited
UNITED STATES PATENTS

| | | | |
|---|---|---|---|
| 1,017,178 | 2/1913 | Selin | 251/25 X |
| 2,222,141 | 11/1940 | Denison | 251/30 X |
| 2,893,680 | 7/1959 | Freund | 251/30 |
| 2,950,732 | 8/1960 | Lambert | 137/219 |

FOREIGN PATENTS OR APPLICATIONS

| | | | |
|---|---|---|---|
| 261,065 | 4/1967 | U.S.S.R. | 137/219 |

*Primary Examiner*—Arnold Rosenthal
*Attorney, Agent, or Firm*—Meyer, Tilberry & Body

[57] ABSTRACT

A pilot valve controlled fluid pressure actuated flow control valve is disclosed which includes a plunger in the flow passageway through the main valve. One end of the plunger defines a piston which is disposed in a piston chamber, and the other end of the plunger defines a valve element displacable into and out of engagement with a valve seat in the passageway. A pilot valve controls the flow of upstream fluid into and from the piston chamber to respectively close and open the main valve passageway. The pilot valve includes a pair of valve elements reciprocable together between first and second positions. In the first position, one of the valve elements closes the passage for delivery of upstream fluid to the piston chamber and the other valve opens a passageway to release upstream fluid from the piston chamber. In the second position, the one valve element opens the passageway for directing upstream fluid to the piston chamber and the other closes the passageway for release of upstream fluid from the piston chamber. Each of the pilot valve elements is biased in its closed position by the pressure of upstream fluid acting thereagainst.

14 Claims, 5 Drawing Figures

PILOT OPERATED FLOW CONTROL VALVE

The present invention relates to the art of fluid flow control devices and, more particularly, to a self-contained pilot valve controlled fluid pressure operated flow control valve.

The present invention relates to an improvement in pilot operated flow control valves of the character having a reciprocable fluid pressure actuated main valve element disposed in a fluid flow passageway extending through the main valve. More particularly, such valves include a reciprocable plunger having a piston portion disposed in a fluid chamber. The piston has inner and outer faces with respect to the chamber and the area of the outer face is smaller than that of the inner face. The outer end of the piston carries or has attached thereto a main valve element which is movable with the piston toward and away from a valve seat in the passageway so as to respectively close or open the passageway to fluid flow through the valve.

Opening and closing movements of the main valve element are controlled by a pilot valve. To close the main valve element the pilot valve is actuated to deliver upstream fluid to the piston chamber wherein the fluid acts against the larger face of the piston to move the valve element into engagement with the valve seat. Upstream fluid is in constant contact with the outer face of the piston, but the smaller area of the latter face precludes opening movement of the valve element so long as the piston chamber is open to upstream fluid. To open the main valve element, the pilot valve is actuated to shut off upstream fluid flow to the piston chamber and to release upstream fluid in the piston chamber for flow to a point downstream of the seat for the main valve element. Therefore, the pressure of upstream fluid acting against the outer face of the piston displaces the piston inwardly of the chamber to open the valve.

Pilot valve arrangements for controlling a fluid flow valve of the foregoing character include a pilot valve element or elements mechanically or electrically actuated to perform the desired valving functions in conjunction with controlling fluid flow to the piston chamber of the main valve element. Such a pilot valve element is displacable between two positions in which it respectively engages a valve seat to block fluid flow to a passageway and is displaced from the seat to permit fluid flow.

The pilot valve element is displaced to and mechanically or electrically held in one of its positions against a return bias which generally is defined by a spring. The spring operates upon release of the holding means to move the valve element to its second position. Regardless of whether valve actuation is mechanical such as by a lever or electrical such as by a solenoid, a considerable operating force is required to overcome the spring force and to maintain the valve element in a displaced position against the spring force. Moreover, if the displacement and holding mechanism includes a solenoid motor, for example, energization of the solenoid is required during the entire period in which the valve element is displaced against return spring force. Constant energization of a solenoid motor is costly from the standpoint of consumption of electrical power and, more importantly, subjects the solenoid winding to the effects of heating resulting from constant energization. Moreover, the operation of solenoid motors is generally accompanied by vibration of the armature. Armature vibration is transmitted to the pilot valve element and thus can affect the seating relationship between the valve element and its valve seat and, accordingly, the flow control function of the pilot valve. Further, such vibration caused undesirable noise in connection with operation of the flow control valve.

The foregoing disadvantages are overcome in accordance with the present invention by providing a pilot valve structure in which a minimum actuating force is required to displace the pilot valve elements between the two positions thereof and in which the pilot valve elements are biased and retained in both positions thereof by the pressure of upstream fluid and independent of any auxiliary holding devices. More particularly, the flow of upstream fluid to the piston chamber of the main valve and the release of upstream fluid from the piston chamber is achieved by a pair of pilot valve elements which are mechanically interconnected and actuated to alternately engage a corresponding valve seat to close a corresponding pilot valve flow passageway. Each valve element engages its seat in the direction of fluid flow through the corresponding passageway. Thus, when either of the valve elements is in engagement with its valve seat, the upstream side of the valve element is exposed to upstream fluid. The valve element is therefore biased toward the valve seat to maintain the corresponding pilot valve flow passageway closed and to maintain the passageway associated with the other pilot valve element open.

Retention of the pilot valve elements in both of the positions thereof by upstream fluid pressure eliminates the necessity of holding and/or return biasing arrangements and thus minimizes the actuating force required to achieve pilot valve element displacement. Moreover, once the valve elements are moved into one or the other of the positions thereof nothing further is required to maintain the valve elements in such position. Therefore, regardless of whether the valve elements are mechanically or electrically actuated it is only necessary to apply a momentary actuating force to displace the valve elements from one position thereof to the other.

Fluid pressure acting against the pilot valve elements in the closing direction assures good sealing engagement between the valve and its seat, and the seating force and thus the sealing effect increases as the pressure of upstram fluid increases. Moreover, if the valve elements are solenoid actuated it will be appreciated that the momentary energization thereof minimizes electrical power consumption and heating of the solenoid coil, and avoids the effects of armature vibration mentioned above.

In accordance with another aspect of the present invention, a compact fluid flow control valve of the foregoing character is provided in which the pilot valve elements are mounted on the opposite ends of a reciprocable rod. The pilot valve elements are disposed in corresponding chambers in a pilot valve housing mounted on the main valve housing, and the valve element chambers and armature rod are parallel to and spaced from the axis of the flow passageway through the main valve housing. In one embodiment the rod is reciprocated through a pivotal lever provided between the valve element chambers. In another embodiment, a solenoid coil surrounds the rod in an area between the valve element chambers and is adapted to be energized to reciprocate the rod and thus the valve elements in opposite directions in their respective chambers. Both arrangements advantageously provide for the pilot valve housing and main valve housing to define a structurally compact self-contained valve unit readily connectable in a flow line at any desired location.

It is accordingly an outstanding object of the present invention to provide an improved pilot valve controlled fluid pressure actuated flow control valve of the character having a main valve element displacable in response to the pressure of upstream fluid acting against opposite sides of a piston associated with the valve element.

A further object is the provision of a fluid flow control valve of the foregoing character having an improved pilot valve structure and operation.

Still a further object is the provision of a fluid flow control valve of the foregoing character in which a pair of interconnected pilot valve elements are each biased into seating engagement with a corresponding valve seat by the pressure of upstream fluid acting thereagainst.

Another object is the provision of a fluid flow control valve of the foregoing character in which the actuating force for displacing the pilot valve elements is minimized and wherein only a momentary application of actuating force is required to achieve displacement of the valve elements from one operative position thereof to another.

Yet another object is the provision of a fluid flow control valve of the foregoing character in which the pilot valve elements are maintained in the operative positions thereof by fluid pressure alone.

Still another object is the provision of a fluid flow control valve of the foregoing character which is self-contained and is of compact construction comprised of a minimum number of parts structurally interrelated to minimize part wear, and the costs of construction, operation and maintenance.

The foregoing objects and others, will in part be obvious and in part pointed out more fully hereinafter in connection with the written description of preferred embodiments of the invention illustrated in the accompanying drawings in which.

Figure 1:
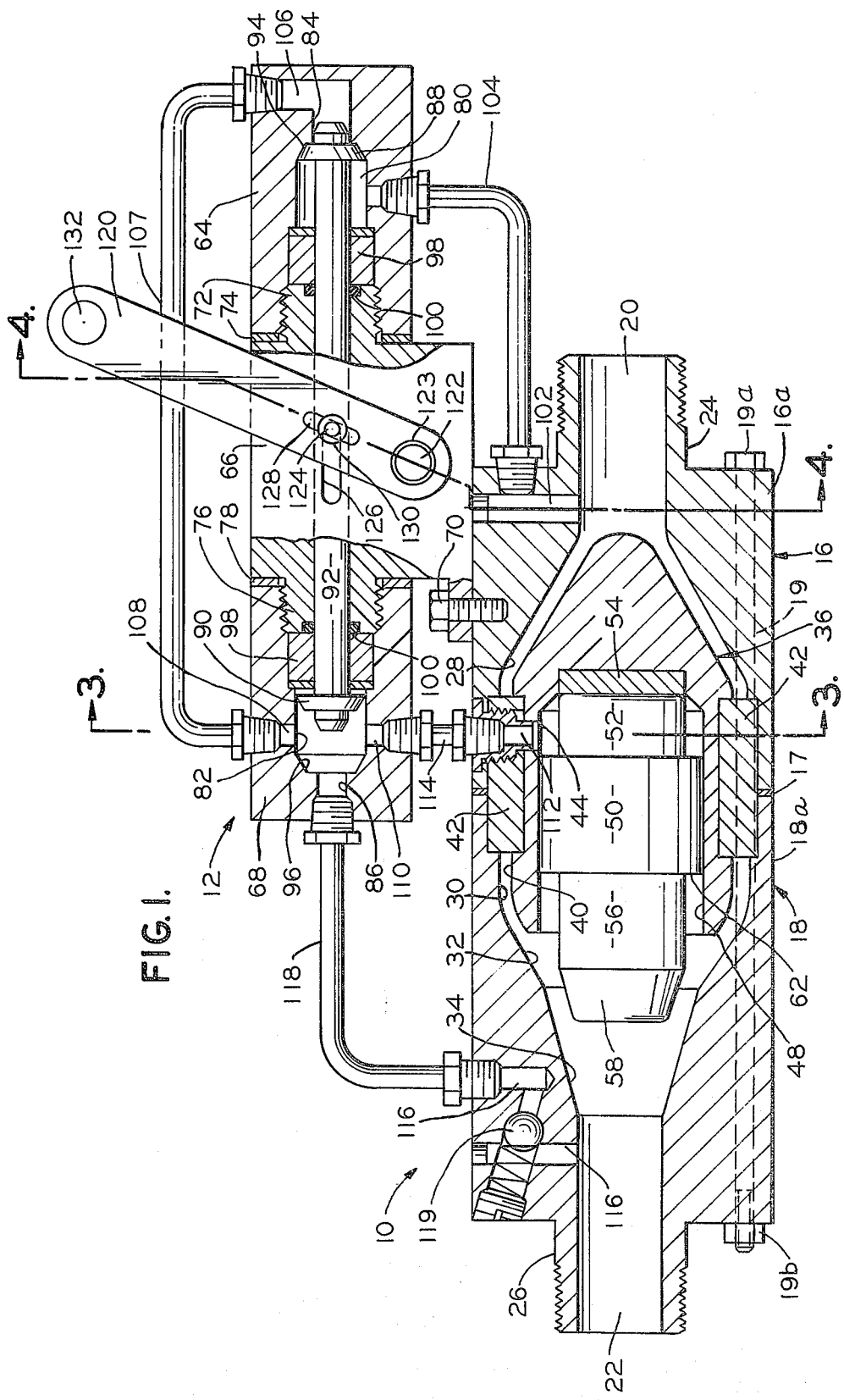
FIG. 1 is a side elevation view, in section, of a flow control valve made in accordance with the present invention and illustrating the main valve element and pilot valve elements in the positions thereof for opening the passageway through the main valve.

Referring now in greater detail to the drawings wherein the showings are for the purpose of illustrating preferred embodiments of the invention only and not for the purpose of limiting the invention, a self-contained pilot valve controlled fluid pressure actuated flow control valve is illustrated in FIGS. 1–4 which is comprised of a housing assembly including a main valve housing 10 and a pilot valve housing 12. Main valve housing 10 is comprised of a pair of housing components 16 and 18 having corresponding ends 16a and 18a. A suitable sealing gasket 17 is interposed between ends 16a and 18a, and the housing components are releaseably interconnected by a plurality of rods 19 extending through aligned openings in the housing components and having heads 19a at one end thereof and nuts 19b at the other end. Housing 10 is provided with a fluid flow passageway therethrough including an inlet end 20 and an outlet end 22 with respect to the direction of fluid flow therethrough. Housing component 16 is provided with an inlet fitting 24 for coupling the valve with a source of fluid and, similarly, housing component 18 is provided with an outlet fitting 26 for connecting the valve with a discharge line for fluid flowing therethrough.

The fluid flow passageway through the main valve is radially enlarged intermediate the inlet and outlet ends thereof. More particularly, with regard to the direction of fluid flow through the passageway, the passageway includes a diverging wall portion 28, an axially extending wall portion 30, a radially converging wall portion 32, and a radially converging shoulder 34 which defines a valve seat for the main valve element, as set forth more fully hereinafter. A flow dividing body 36 is supported in the passageway and is provided with a conical end portion 38 facing inlet end 20 of the passageway and having an outer surface generally parallel to and spaced radially inwardly of surface portion 28 of the fluid flow passageway. The other end of flow dividing body 36 is cylindrical and includes an outer surface 40 generally parallel to and spaced radially inwardly of surface portion 30 of the fluid flow passageway. Body 36 is supported in coaxial relationship with respect to the fluid flow passageway by a pair of key elements 42 which are received in corresponding key slots provided in housing components 16 and 18 and in body 36. While keys 42 are shown as elements separable from both the housing components and body 36, it will be appreciated that the keys could be formed integral with body 36.

Flow dividing body 36 is provided with a cylindrical fluid chamber 44 having a closed inner end and an open outer end 48 facing outlet end 22 of fluid flow passageway. A cylindrical plunger or piston 50 is supported by the inner surface of chamber 44 for reciprocating movement toward and away from valve seat 34. Piston 50 includes an inner end 52 adapted to engage the inner end of chamber 44 to limit movement of the piston inwardly of the chamber. In the embodiment illustrated, at least end 52 of the piston is of suitable magnetic metal, and the inner end of chamber 44 is provided with a permanent magnet element 54 which serves to lightly hold the piston inwardly of the chamber when the main valve is open, for the purpose set forth hereinafter. The outer end of piston 50 is provided with a main valve element 56. Valve element 56 may be of the same material as piston 50 and formed integral therewith, or may be a separate element which is suitably interconnected with the piston for axial displacement therewith relative to valve seat 34. Valve element 56 has a conical nose portion 58 contoured for mating engagement with valve seat 34 to close the fluid flow passageway through the valve when the components are in the positions illustrated in FIG. 2 of the drawing.

Piston 50 has an inner face within chamber 44 and the area of which corresponds generally to the cross-sectional area of chamber 44. Further, the piston has an annular outer face 62. The outer diameter of outer face 62 corresponds to that of piston 50, and the inner diameter of face 62 is defined by the diameter of the annular line of juncture between the inner end of valve element 56 and outer face 62 of the piston. Accordingly, it will be appreciated that the area of outer face 62 of the piston is smaller than that of the inner face thereof. The component parts of the main valve and the pilot valve to be described hereinafter may be metal or plastic depending on the fluid to be handled, such as air, gas, water, acid and the like.

Figure 2:
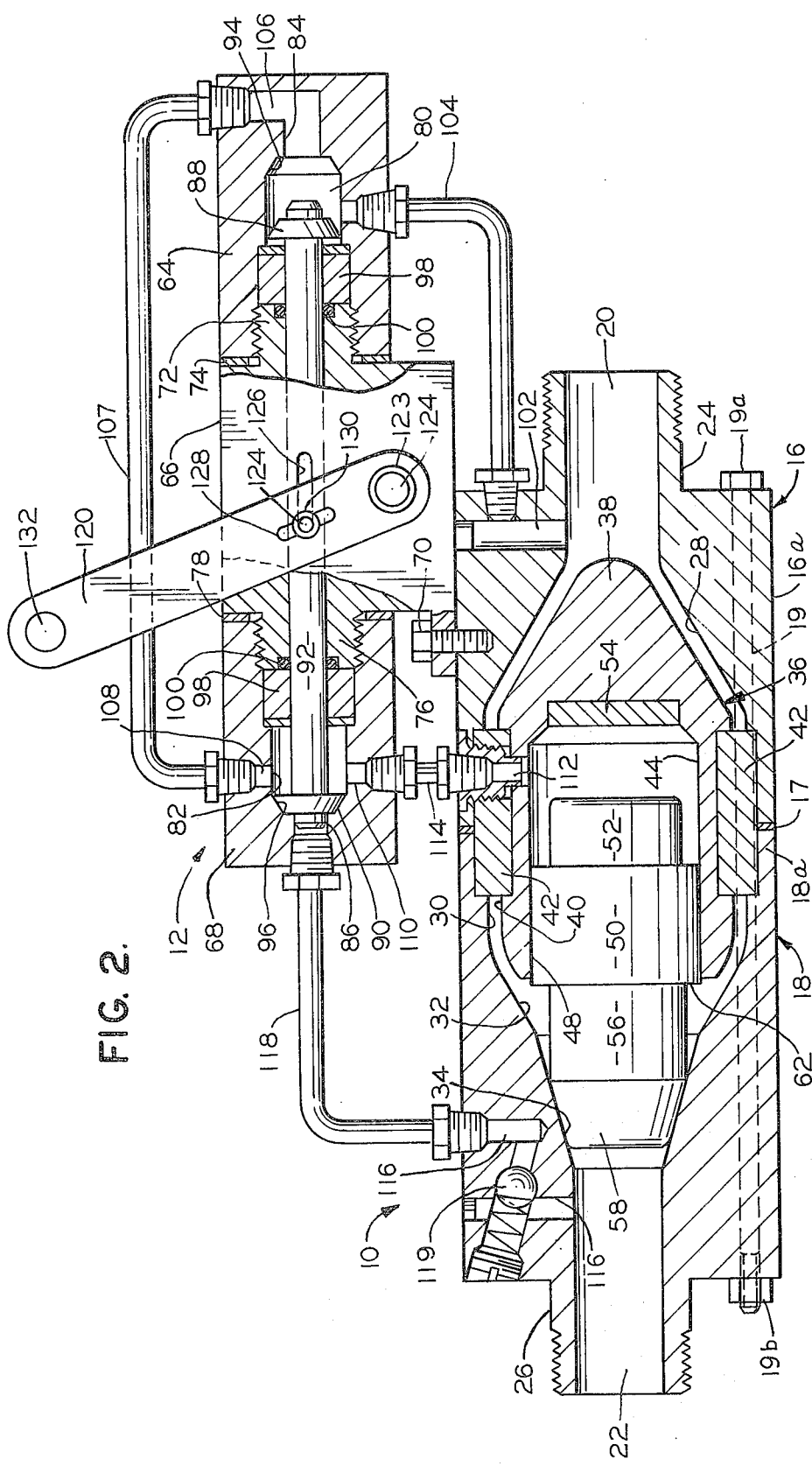
FIG. 2 is a side elevation view, in section, of the valve illustrated in FIG. 1 and showing the main valve element and pilot valve elements in the positions thereof for closing the passageway through the valve.
Figure 3:
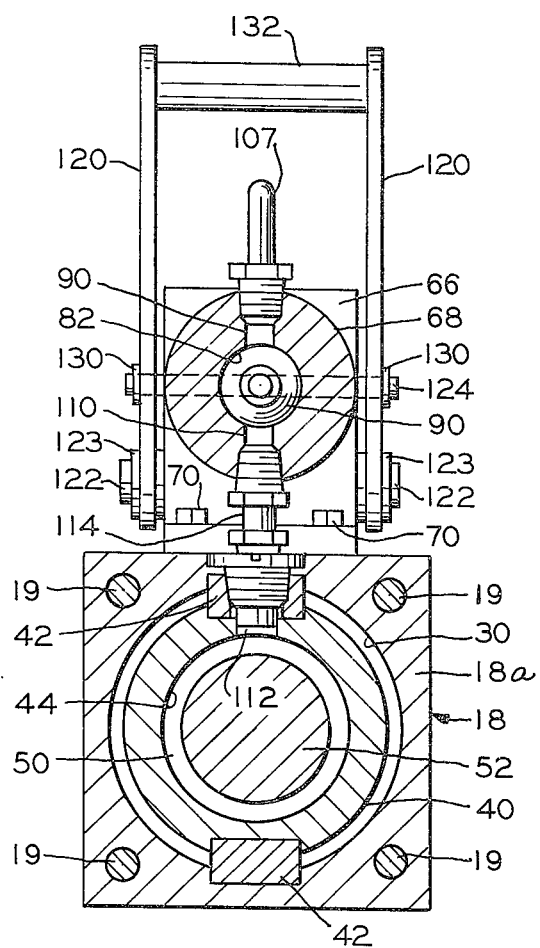
FIG. 3 is a cross-sectional elevation view of the valve as seen in the direction of line 3—3 FIG. 1.
Figure 4:
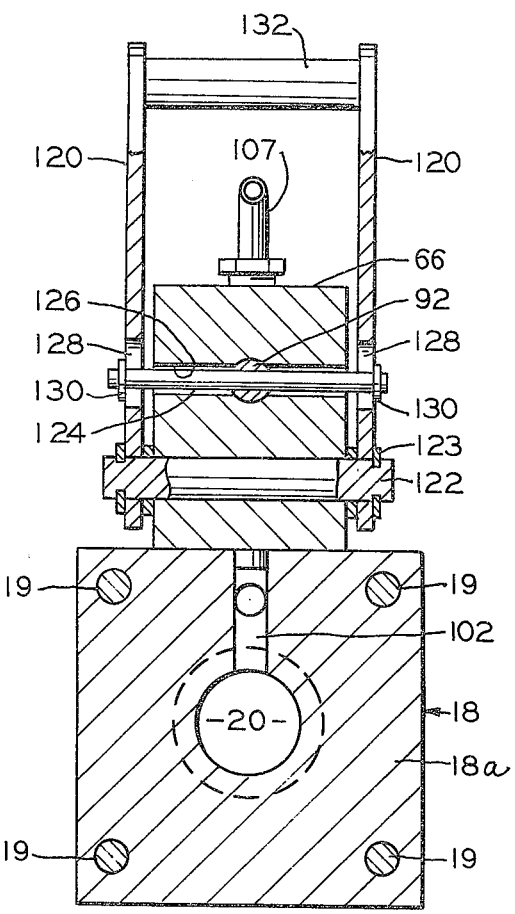
FIG. 4 is a cross-sectional elevation view of the valve as seen along line 4—4 in FIG. 1; and, FIG. 5 is a side elevation view, partially in section, showing a modification of the pilot valve actuating arrangement.

The main valve structure provides for the main fluid flow passageway to be open from inlet end 20 to valve seat 34. Thus, when the passageway is closed by engagement of valve element 56 with seat 34, as illustrated in FIG. 2, upstream fluid fills the passageway and the pressure thereof is applied to outer face 62 of the piston. As set forth more fully hereinafter, when the fluid flow passageway is closed upstream fluid is disposed in chamber 44 behind piston 50 and the pressure of the fluid is applied against the inner face of the piston. The larger area of the inner face relative to outer face 62 thus provides for the upstream fluid to bias piston 50 toward outlet end 22 to close the fluid flow passageway. When upstream fluid is released from chamber 44 the upstream fluid acting against outer face 62 of the piston causes the latter to be displaced axially inwardly of chamber 44, thus to move valve element 56 away from seat 34 to open the fluid flow passageway.

The flow of upstream fluid to achieve valve actuation in the foregoing manner is controlled by the pilot valve assembly which includes pilot valve housing 12 mounted on the main valve housing. The pilot valve housing includes separably interconnected portions 64, 66 and 68. Outer housing portions 64 and 68 are each threadedly mounted on intermediate portion 66. In this respect, housing portion 64 is provided with an axial bore and the outer end thereof is internally threaded to receive an externally threaded neck 72 extending from intermediate housing portion 66. A sealing gasket 74 is interposed between housing portions 64 and 66 to provide a fluid tight juncture therebetween. Similarly, outer housing portions 68 is provided with an axial bore the outer end of which is internally threaded to receive an externally threaded neck 76 extending from intermediate housing member 66. A sealing gasket 78 is interposed between housing portions 66 and 68 to seal the juncture therebetween.

The axial bore in housing portion 64 provides a valve element chamber 80 therein, and the axial bore in housing portion 68 provides a valve element chamber 82 therein. Chambers 80 and 82 are axially aligned, and the axially opposite ends thereof are provided with corresponding outlet passages 84 and 86, respectively. A valve element 88 is provided in chamber 80 and a valve element 90 is provided in chamber 82, and the latter valve elements are rigidly interconnected in axially spaced apart relationship by a valve rod 92. Valve elements 88 and 90 may be formed integral with rod 92 or may be separate elements suitably secured thereto.

Outlet passageways 84 and 86 in the pilot valve element chambers include tapered seat portions 94 and 96, respectively, against which the corresponding valve element is adapted to seat to close the outlet passageway. Further, valve elements 88 and 90 are axially spaced apart a distance less than the axial distance between valve seats 94 and 96, whereby when one of the valve elements closes the corresponding outlet passageway the other valve element is positioned to open the corresponding outlet passageway.

Valve rod 92 extends through an opening provided therefor in intermediate housing portion 66, and leakage of fluid from chambers 80 and 82 along valve rod 92 is prevented by suitable packing 98 surrounding the rod in the bores in housing portions 64 and 68 and O-rings 100 surrounding the rod adjacent the outer ends of necks 72 and 76 of intermediate housing portion 66.

As is seen in FIGS. 1 and 2, main valve housing component 16 is provided with a bore 102 opening into inlet end 20 of the main valve flow passageway. Further, a flow line 104 has its opposite ends in flow communication with bore 102 and valve element chamber 80 such that flow line 104 opens into chamber 80 behind valve element 88 when the latter is in engagement with valve seat 94. Outlet passageway 84 of chamber 80 is in fluid flow connumication with valve element chamber 82 by means of a suitable fluid flow passageway therebetween which, in the embodiment illustrated, is defined by a bore 106 in pilot valve housing portion 64, a bore 108 in pilot valve housing portion 68, and a flow line 107 having its opposite ends suitably coupled with bores 106 and 108. Bore 108 opens into valve element chamber 82 at a location behind valve element 90 when the latter is in engagement with valve seat 96, as illustrated in FIG. 2. Valve element chamber 82 is in fluid communication with piston chamber 44 through a passageway defined by a bore 110 in pilot valve housing portion 68, a passageway 112 through main valve housing component 18, upper key 42 and flow dividing member 36, and a nipple 114 having its opposite ends suitably coupled with bore 110 and passageway 112. Further, outlet passageway 86 of valve element chamber 82 is in flow communication with the downstream side of the fluid flow passageway through the main valve by means of a valved passageway 116 in main valve housing component 18 and a flow line 118 having its opposite ends suitably coupled with outlet passageway 86 and valved passageway 116. Preferably, a spring biased valve 119 is provided in passageway 116 intermediate the opposite ends thereof to prevent backflow of downstream fluid toward valve element chamber 82.

When the component parts of the main and pilot valve units are in the positions illustrated in FIG. 2 of the drawing, upstream fluid is delivered to pilot valve element chamber 80 and thence to valve element chamber 82 and piston chamber 44 behind piston 50. Therefore, the pressure of upstream fluid acts against the inner face of piston 50 to bias the latter toward outlet end 22 of the main valve passageway, whereby nose 58 of valve element 56 engages seat 34 to close the main valve passageway. Further, the pressure of upstream fluid is applied behind pilot valve element 90 biasing the latter against seat 96, whereby outlet passageway 86 is maintained closed. When it is desired to open the main valve element to permit fluid flow from inlet end 20 through outlet end 22, valve rod 92 is displaced to the position illustrated in FIG. 1 of the drawing. When so displaced, valve element 88 engages seat 94 to close outlet passageway 84, and the pressure of upstream fluid is applied behind valve element 88 to bias the latter against its seat. Simultaneously, valve element 90 is displaced to open outlet passageway 86, whereby upstream fluid in piston chamber 44 and in the fluid flow passageway between chambers 80 and 82 is released to flow into outlet end 22 of the main valve passageway downstream of valve seat 34.

The release of upstream fluid pressure from piston chamber 44 provides a pressure differential on opposite sides of piston 50, whereby the upstream fluid acting against outer face 62 of piston 50 displaces the piston inwardly of chamber 44 to move valve element 56 to the open position, whereby fluid flows through the main valve passageway. As mentioned hereinabove, inner end 52 of piston 50 is retained against the inner end of the piston chamber by permanent magnet 54. Such retention is advantageous to minimize vibration or undesirable movement of piston 50 and valve element 56 during periods of fluid flow through the main valve passageway. It will be appreciated, however, that magnetic retention is not absolutely necessary to proper functioning of the valve. Moreover, it will be appreciated that the holding force of permanent magnet 54 is small and is immediately overcome upon the application of upstream fluid against the inner face of the piston to achieve closing of the main valve passageway.

It will be appreciated from the foregoing description of the main and pilot valve units that bore 102, flow line 104, valve element chamber 80, outlet passageway 84, bore 106, flow line 107, bore 108, valve element chamber 82, bore 110, nipple 114 and passageway 112 together define a first control fluid passageway having an inlet end opening into the main valve passageway upstream of valve seat 34 and an outlet end opening into piston chamber 44 behind piston 50. Further, outlet passageway 86, flow line 118 and bore 116 define a second control fluid passageway having an inlet end in flow communication with piston chamber 44 and the first control fluid passageway and an outlet end opening into the main valve passageway downstream of valve seat 34. While a specific structural embodiment of bores and flow lines is illustrated and described, it will be appreciated that many arrangements can be devised to achieve the desired control fluid flow with respect to the main valve piston chamber and to achieve the desired action of upstream fluid on the pilot valve elements.

Reciprocation of valve rod 92 to achieve displacement of the pilot valve elements between the two positions thereof can be achieved in any desired manner. In the embodiment illustrated in FIGS. 1–4, such displacement is achieved through a lever mechanism which can be manually or otherwise displaced to reciprocate the valve rod. More particularly, the lever mechanism includes a pair of lever arms 120 disposed on opposite sides of pilot valve housing portion 66 and interconnected for pivotal movement relative to the housing portion by means of a pin 122 extending through an opening therefor in the housing portion and through openings in lever arms 120. The ends of the pin receive suitable retaining elements 123, each as split rings. Valve rod 92 is provided with a pin 124 which extends laterally from the opposite sides of the rod through corresponding longitudinal slots 126 in housing portion 66. The outer ends of pin 124 extend through corresponding slots 128 provided in levers 120 and receive pin retaining elements 130, such as split rings. The outer ends of levers 120 are rigidly interconnected by a cross rod 132 which is suitably secured to the levers.

It will be appreciated from the foregoing description that levers 120 can be pivoted manually or otherwise in opposite directions about the axis of pin 122 to axially reciprocate rod 92 and thus displace valve elements 88 and 90 between the two positions thereof with respect to the corresponding valve element chamber. It will be further appreciated that once the lever mechanism is pivoted to one or the other of the positions thereof nothing further is required to provide for the pilot valve elements to be retained in the corresponding positions thereof since such retention is accomplished by the pressure of upstream fluid acting behind one or the other of the pilot valve elements. Moreover, the force required to displace the lever mechanism and thus the valve rod and valve elements in both of the two directions of displacement is minimized and, more particularly, is only that force necessary to overcome the valve element seating force resulting from the pressure of upstream fluid.

Figure 5:
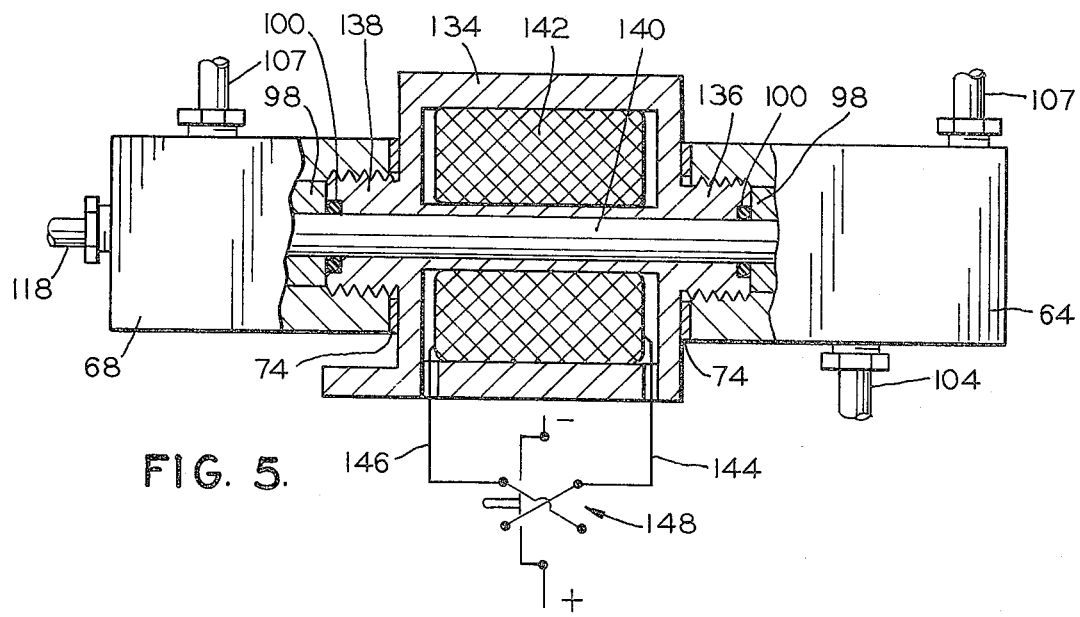

While a lever mechanism is illustrated in FIGS. 1–4 for achieving pilot valve actuation, it will be appreciated that any number of mechanisms for manual or electrical actuation of the pilot valve can be devised and employed to advantage in connection with the pilot valve structure described above. For example, as illustrated in FIG. 5, the pilot valve housing can be adapted readily to provide for solenoid operation of the pilot valve elements. The pilot valve illustrated in FIG. 5 is structurally similar to the pilot valve described hereinabove and, accordingly, like numerals are employed in FIG. 5 to denote components corresponding to those illustrated in FIGS. 1–4.

In the embodiment of FIG. 5, intermediate housing portion 66 is replaced by a solenoid housing 134 having an axial length corresponding to that of housing portion 66. Housing 134 is provided on its axially opposite ends with externally threaded necks 136 and 138 for connection with pilot valve housing portions 64 and 68, respectively. Further, housing 134 is provided with an opening therethrough for valve rod 140 which, in the present embodiment, is defined by magnetic material adapted to function as a solenoid armature. A solenoid coil 142 is disposed in housing 134 and is in the form of a winding surrounding rod 140 and having opposite ends 144 and 146 connectable across a suitable source of electrical power through a double-pole, double-throw switch 148. Accordingly, rod 140 is displaced either to the right or to the left, as viewed in FIG. 5, depending on the throw of switch 148 and thus the direction of current flow through coil 142. It will be appreciated that switch 148 can be located on or near the valve unit or at a remote location to provide for remote control of the pilot valve.

In connection with solenoid actuation of the pilot valve, it will be appreciated from the foregoing description of the pilot valve operation that it is only necessary to momentarily energize the solenoid coil to achieve displacement and retention of the pilot valve elements in the corresponding positions thereof within their corresponding chambers. Thus, when the valve rod and valve elements are displaced to one or the other of the positions thereof they are maintained in such positions by upstream fluid acting on one of the valve elements and the solenoid coil can be de-energized. This advantageously provides for minimizing current consumption and coil heating, and avoids the undesirable affects of solenoid vibration which accompanies continued energization thereof.

The longitudinally parallel relationship between the pilot valve assembly and the main valve assembly of the preferred embodiments described above lends to compactness of the overall structure. Moreover, the provision of three pilot valve housing poritons separably interconnected with one another as shown, together with a main valve structure in which the parts are separably interconnected as shown and described, facilitates efficiency in assembly and disassembly for purposes of repair or replacement operations. However, it will be appreciated that many modifications with regard to the specific structures of the component parts and the specific structural relationship therebetween can be made without departing from the principles of the present invention. In this respect, it will be appreciated that the present invention is applicable in general to pilot valve controlled piston-type main valves in which a differential force on opposite sides of the piston is employed to achieve opening and closing of the main valve. Accordingly, it is to be distinctly understood that the foregoing descriptive matter is to be interpreted merely as illustrative of the present invention and not as a limitation.

What is claimed is:

1. A fluid pressure operated flow control valve comprising, housing means having a main fluid flow passageway therethrough having upstream and downstream ends with respect to the direction of fluid flow therethrough, a main valve seat in said main passageway between said upstream and downstream ends, a main valve element reciprocable axially of said seat and movable into engagement therewith in the direction of fluid flow to close said main passageway, piston means for reciprocating said main valve element, means defining a piston chamber in said main passageway receiving and reciprocably supporting said piston means, first control fluid passageway means having an inlet end opening into said main passageway upstream from said main valve seat and an outlet end opening into said piston chamber behind said piston means, second control fluid passageway means having an inlet end in flow communication with said piston chamber and said first passageway means and having an outlet end opening into said main passageway downstream from said main valve seat, said first passageway means having a first valve seat between said inlet end thereof and said inlet end of said second passageway means, a first valve element engageable with said first seat in the direction of fluid flow through said first passageway means, said second passageway means having a second valve seat, a second valve element engageable with said second seat in the direction of fluid flow through said second passageway means, actuator means for said first and second valve elements including means interconnecting said first and second valve elements for simultaneous displacement of one into engagement with the corresponding valve seat and the other out of engagement with the corresponding valve seat, said means interconnecting said first and second valve elements being rod means, and said actuator means further including means to reciprocate said valve rod means, said valve rod means defining a solenoid armature and said means for reciprocating said valve rod means being solenoid coil means magnetically coupled with said valve rod means.

2. A fluid pressure operated flow control valve comprising, housing means having a main fluid flow passageway therethrough having upstream and downstream ends with respect to the direction of fluid flow therethrough, a main valve seat in said main passageway between said upstream and downstream ends, a main valve element reciprocable axially of said seat and movable into engagement therewith in the direction of fluid flow to close said main passageway, piston means for reciprocating said main valve element, means defining a piston chamber in said main passageway receiving and reciprocably supporting said piston means, first control fluid passageway means having an inlet end opening into said main passageway upstream from said main valve seat and an outlet end opening into said piston chamber behind said piston means, second control fluid passageway means having an inlet end in flow communication with said piston chamber and said first passageway means and having an outlet end opening into said main passageway downstream from said main valve seat, said first passageway means having a first valve seat between said inlet end thereof and said inlet end of said second passageway means, a first valve element engageable with said first seat in the direction of fluid flow through said first passageway means, said second passageway means having a second valve seat, a second valve element engageable with said second seat in the direction of fluid flow through said second passageway means, actuator means for said first and second valve elements including means interconnecting said first and second valve elements for simultaneous displacement of one into engagement with the corresponding valve seat and the other out of engagement with the corresponding valve seat, said housing means including main valve housing means having said main flow passageway therthrough and first and second pilot valve housing portions mounted on said main valve housing means and spaced apart in the direction of said main fluid flow passageway, said first and second housing portions having axially aligned chambers defining portions of said first control fluid passageway means, said first and second valve elements being respectively in said first and second housing portion chambers, said means interconnecting said first and second valve elements being rod means having opposite ends in said chambers and connected to the corresponding one of said first and second valve elements to support said elements in spaced apart relationship and for movement with one another axially of said housing portion chambers, said rod means including a portion extending between said first and second housing portions, said first and second valve element seats being axially aligned and spaced apart a distance greater than the space between said first and second valve elements, and said actuating means further including means operatively interengaged with said rod portion to selectively displace said rod means in axially opposite directions.

3. The flow control valve according to claim 2, wherein said means operatively interengaged with said rod portion is pivotal lever means.

4. The flow control valve according to claim 3, and third pilot valve housing means between said first and second housing means, said third housing means supporting said pivotal lever means.

5. The flow control valve according to claim 4, wherein each said first and second housing means is threadedly interengaged with said third housing means to separably interconnect said first, second and third housing means.

6. The flow control valve according to claim 2, wherein at least said portion of said rod means defines a solenoid armature, and said means operatively interengaged with said rod portion includes a solenoid winding surrounding said rod portion.

7. The flow control valve according to claim 6, and third pilot valve housing means between said first and second housing means and supporting said solenoid winding.

8. The flow control valve according to claim 7, wherein each said first and second housing means is threadedly interengaged with said third housing means to separably interconnect said first, second and third housing means.

9. A fluid pressure operated flow control valve comprising, housing means having a fluid flow passageway therethrough, said passageway having upstream and downstream ends with respect to fluid flow therethrough, means intermediate said passageway ends providing a piston chamber coaxial with said passageway and having an outer end facing downstream, said passageway including a shoulder spaced downstream from said outer end of said piston chamber and providing a main valve seat coaxial with said piston chamber, a piston reciprocably supported in said piston chamber and having inner and outer faces with respect to said piston chamber, a valve element on said piston forwardly of said outer face, said valve element being movable by said piston into and out of engagement with said main valve seat, said outer face of said piston having a smaller surface area than said inner face, said housing means including first and second valve element chambers laterally spaced from said passageway and axially aligned and spaced apart from one another, said valve element chambers having aligned outlet passageways opening into the axially opposite ends thereof, a reciprocable actuator rod coaxial with said valve element chambers and having opposite ends extending into said valve element chambers through the axially adjacent ends thereof, first and second valve elements respectively in said first and second valve element chambers and connected to the corresponding end of said rod for reciprocating movement therewith, each said first and second valve elements being adapted to engage and close the corresponding outlet passageway, said rod axially spacing said first and second valve elements a distance less than the axial space between said outlet passageways, whereby movement of either of said first and second valve elements to close the corresponding outlet passageway moves the other to open the corresponding outlet passageway, first flow path means for delivering upstream fluid into said first valve element chamber at a location behind said first valve element when said first valve element closes the corresponding outlet passageway, second flow path means for delivering upstream fluid to said second valve element chamber and said piston chamber, said second flow path means including a portion extending from the outlet passageway of said first valve element chamber and opening into said second valve element chamber at a location behind said second valve element when said second valve element closes the corresponding outlet passageway, third flow path means for delivering upstream fluid from said piston chamber and second valve chamber through the outlet passageway of said second valve chamber to a location downstream from said main valve seat, and means to reciprocate said rod to alternatively move said first and second valve elements to close the outlet passageway of the corresponding valve chamber.

10. The flow control valve according to claim 9, wherein said means to reciprocate said rod includes pivotal lever means.

11. The flow control valve according to claim 9, wherein at least a portion of said rod is a solenoid armature and said means to reciprocate said rod includes solenoid winding means surrounding said rod portion.

12. The flow control valve according to claim 11, wherein said winding has opposite ends connectable across an electrical power supply, and switch means for reversing current flow through said winding.

13. The flow control valve according to claim 9, wherein said housing means includes separable first, second and third housing components, said first and second housing components being spaced apart by said third housing component and having ends facing said third housing component, said first and second valve element chambers being defined respectively by bores extending into said first and second housing components from the corresponding one of said ends, said bores each being internally threaded adjacent said ends, and neck means on said third housing component for each of said first and second housing components, said neck means being externally threaded for engagement with the threaded bore of the corresponding one of said first and second housing components.

14. A fluid pressure operated flow control valve comprising, housing means having a main fluid flow passageway therethrough having upstream and downstream ends with respect to the direction of fluid flow therethrough, a main valve seat in said main passageway between said upstream and downstream ends a main valve element reciprocable axially of said seat and movable into engagement therewith in the direction of fluid flow to close said main passageway, piston means for reciprocating said main valve element, means defining a piston chamber in said main passageway receiving and reciprocably supporting said piston means, said housing means including first and second valve element chambers laterally spaced from said main passageway and axially aligned and spaced apart from one another, said valve element chambers having aligned outlet passageways opening into the axially opposite ends thereof, a reciprocable actuator rod coaxial with said valve element chambers and having opposite ends extending into said valve element chambers through the axially adjacent ends thereof, first and second valve elements respectively in said first and second valve element chambers and connected to the corresponding end of said rod for reciprocating movement therewith, each said first and second valve elements being adapted to engage and close the corresponding outlet passageway, said rod axially spacing said first and second valve elements a distance less than the axial space between said outlet passageways, whereby movement of either of said first and second valve elements to close the corresponding outlet passageway moves the other to open the corresponding outlet passageway, first flow path means for delivering upstream fluid into said first valve element chamber at a location behind said first valve element when said first valve element closes the corresponding outlet passageway, second flow path means ior delivering upstream fluid to said second valve element chamber and said piston chamber, said second flow path means including a portion extending from the outlet passageway of said first valve element chamber and opening into said second valve element chamber at a location behind said second valve element when said second valve element closes the corresponding outlet passageway, third flow path means for delivering upstream fluid from said piston chamber and second valve chamber through the outlet passageway of said second valve chamber to a location downstream from said main valve seat, and means to reciprocate said rod to alternatively move said first and second valve elements to close the outlet passageway of the corresponding valve chamber.

* * * * *